(12) United States Patent
Wu et al.

(10) Patent No.: US 8,149,573 B2
(45) Date of Patent: Apr. 3, 2012

(54) ELECTRONIC DEVICE

(75) Inventors: Wei-Min Wu, Tao Yuan Shien (TW); Chih-Wei Huang, Tao Yuan Shien (TW); Hsiang-Jung Hung, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 181 days.

(21) Appl. No.: 12/788,363

(22) Filed: May 27, 2010

(65) Prior Publication Data

US 2011/0182018 A1    Jul. 28, 2011

(30) Foreign Application Priority Data

Jan. 26, 2010    (TW) ............................... 99201545 U

(51) Int. Cl.
*G06F 1/16*    (2006.01)

(52) U.S. Cl. ................ 361/679.27; 455/575.1; 349/138; 345/522

(58) Field of Classification Search .................. 455/566, 455/575.1, 412.2, 347; 345/173, 589, 158, 345/665, 581, 175, 522, 650, 156, 690; 349/58, 349/60, 138, 150, 114, 122; 361/679.27, 361/679.28, 679.01, 679.26, 679.3, 679.29, 361/679.08, 679.09, 679.21, 679.06, 679.58, 361/679.55, 749; 257/686, 737; 248/346.04, 248/346.01, 185.1
See application file for complete search history.

(56) References Cited

U.S. PATENT DOCUMENTS

| | | | | |
|---|---|---|---|---|
| 5,028,025 | A * | 7/1991 | Herron et al. | 248/185.1 |
| 6,497,279 | B1 * | 12/2002 | Williams et al. | 166/250.01 |
| 2010/0226103 | A1 * | 9/2010 | Muro et al. | 361/749 |

* cited by examiner

*Primary Examiner* — Hung Duong
(74) *Attorney, Agent, or Firm* — Thomas|Kayden

(57) ABSTRACT

An electronic device is provided, including a main body, a display module pivotally connected to the main body, a first magnet in the main body, a second magnet in the display module, a lever movably disposed in the main body, and a joining member movably disposed in the main body and connected to the lever. When the display module and the main body are folded, the second magnet attracts the first magnet, and the lever pushes the joining member to protrude from the main body and join with the display module.

10 Claims, 8 Drawing Sheets

ELECTRONIC DEVICE

CROSS REFERENCE TO RELATED APPILCATIONS

This Application claims priority of Taiwan Patent Application No. 099201545, filed on Jan. 26, 2010, the entirety of which is incorporated by reference herein.

BACKGROUND OF THE INVENTION

1. Field of the Invention

This application relates in general to an electronic device and in particular to a foldable laptop PC or tablet PC.

2. Description of the Related Art

Referring to FIG. 1, a conventional tablet PC primarily comprises a main body 10 and a display module 20 pivotally connected to the main body 10. When the display module 20 is unfolded with respect to the main body 10, as shown in FIG. 1, the display module 20 is rotatable around a first axis C1 or a second axis C2 for convenient viewing from different angles. When the display module 20 and the main body 10 are folded, as shown in FIG. 2, a joining mechanism may be provided to restrict rotation or sliding of the display module 20 relative to the main body 10.

Conventional laptop or tablet PCs apply hook and slot mechanisms to restrict relative motion between the display module 20 and the main body 10. However, the hooks and slots may adversely affect aesthetic and integral appearance of the main body 10 or the display module 20. Furthermore, the protruding hooks can easily be damaged due to impact or wear and tear.

BRIEF SUMMARY OF INVENTION

The application provides an electronic device, including a main body, a display module pivotally connected to the main body, a first magnet in the main body, a second magnet in the display module, a lever movably disposed in the main body, and a joining member movably disposed in the main body and connected to the lever. When the display module and the main body are folded, the second magnet attracts the first magnet, and the lever pushes the joining member to protrude from the main body and join with the display module.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
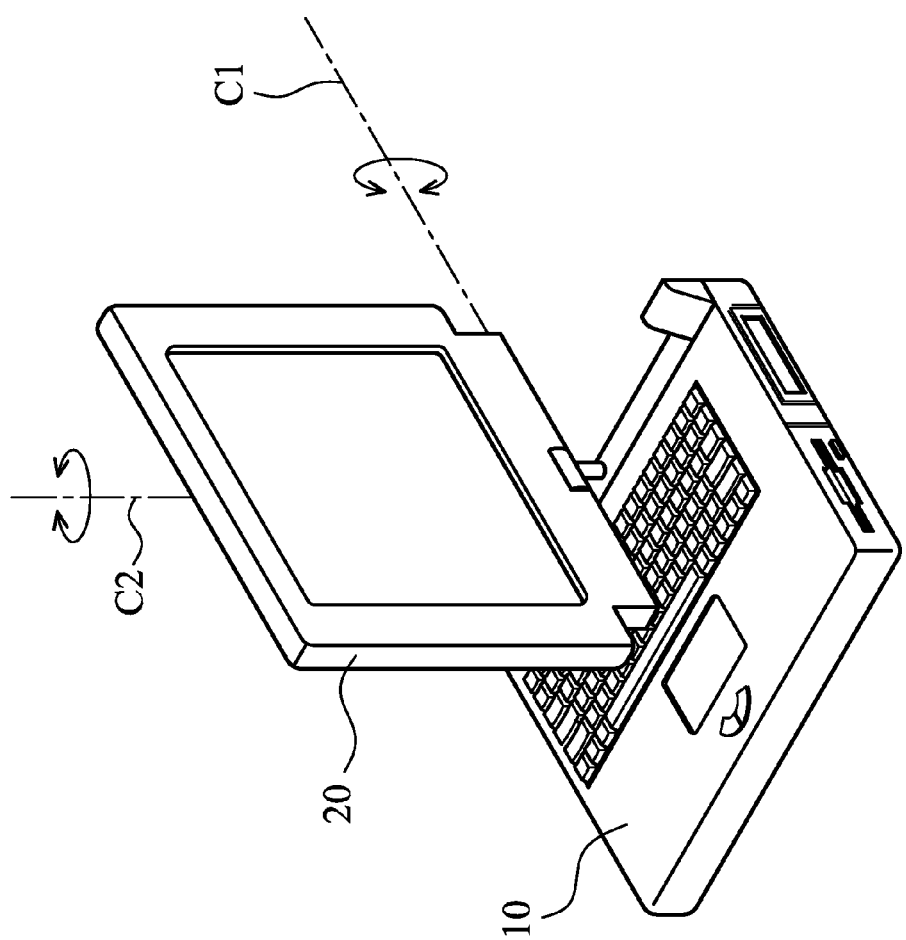
FIGS. 1 and 2 are perspective diagrams of a conventional foldable tablet PC.
Figure 2:
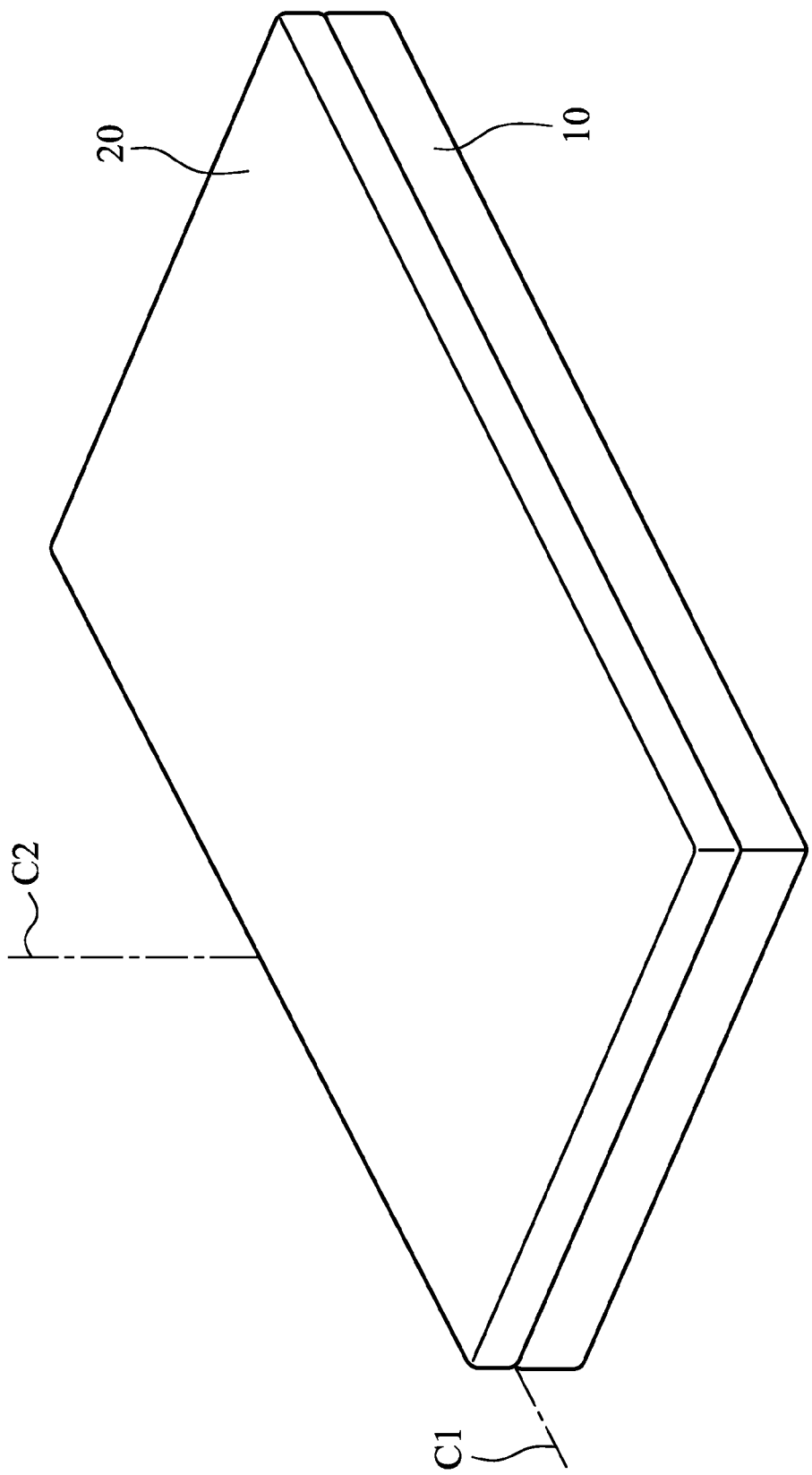
Figure 3A:
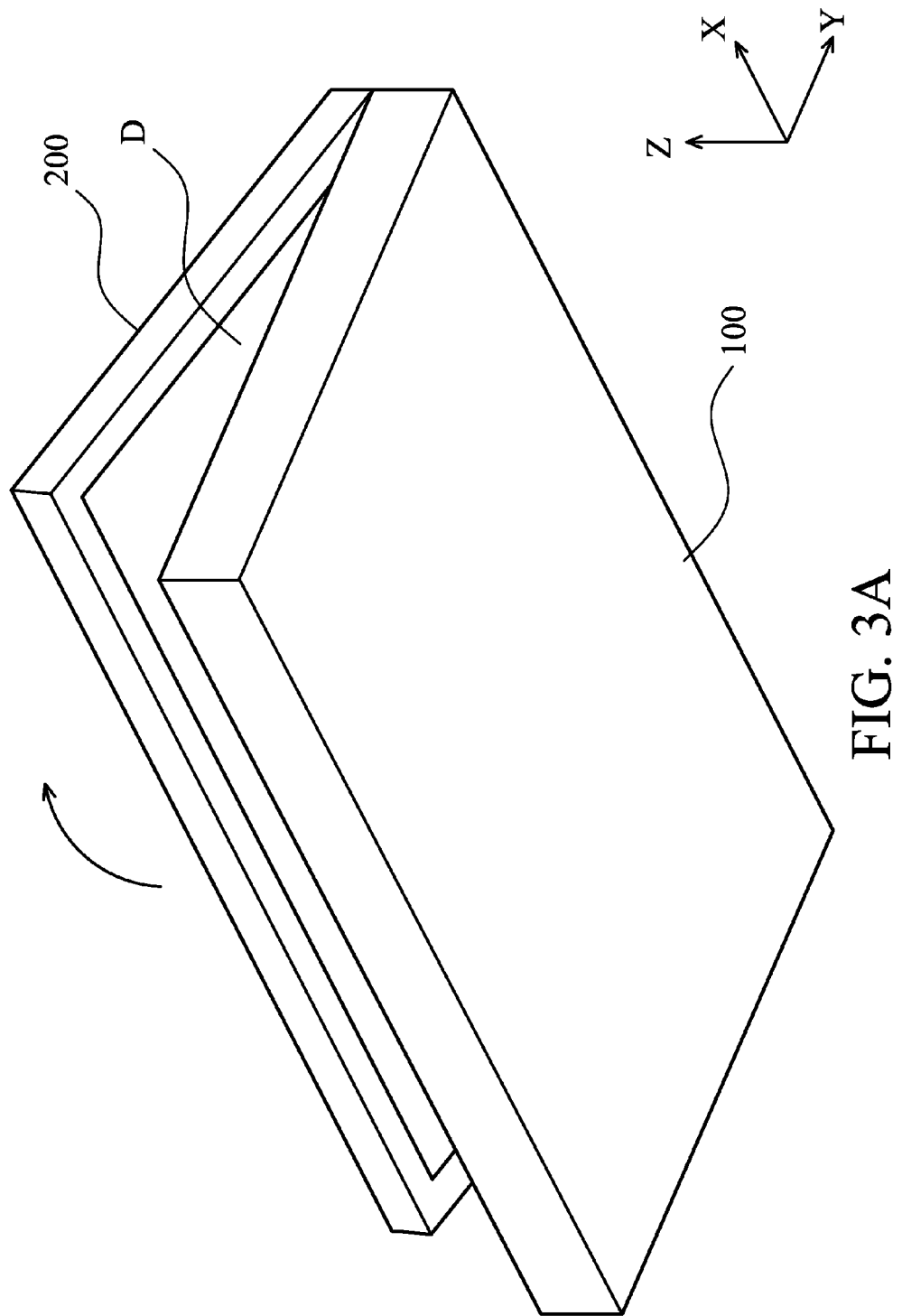
FIGS. 3A and 3B are perspective diagrams of an electronic device according to an embodiment of the invention.
Figure 3B:
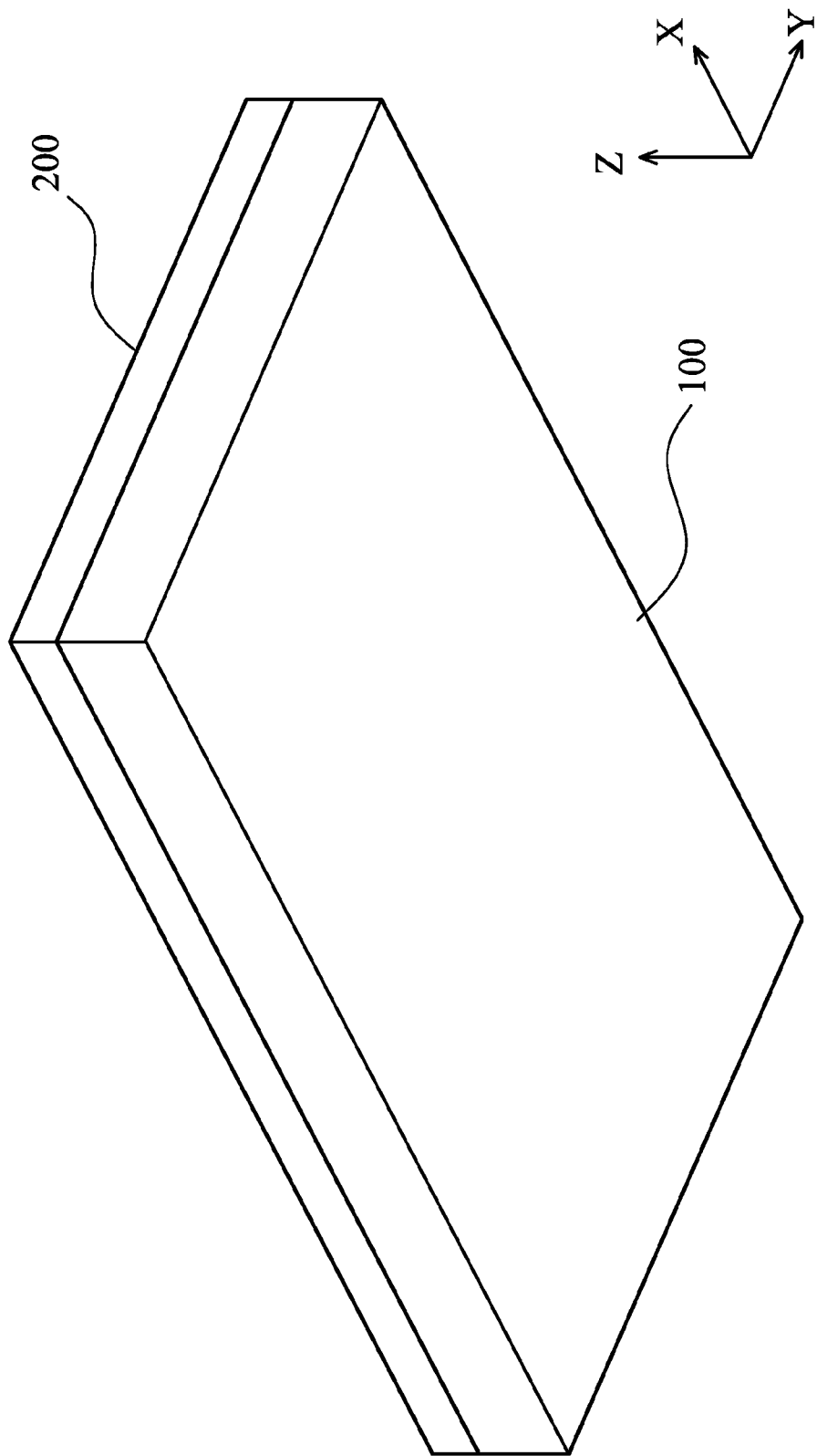

An embodiment of an electronic device, such as a notebook PC or tablet PC shown in FIGS. 3A and 3B, primarily comprises a main body 100 and a display module 200 pivotally connected thereto. When using the electronic device, as the arrow shows in FIG. 3A, the display module 200 is unfolded with respect to the main body 100. Furthermore, the display module 200 is rotatable around the X or Y axis with respect to the main body 100, as shown in FIG. 3B, so that the users can see the screen D from different viewing angles. When the display module 200 and the main body 100 are folded, relative rotation between the display module 200 and the main body 100 is restricted by a joining mechanism as shown in FIGS. 4A-5B.

Figure 4A:
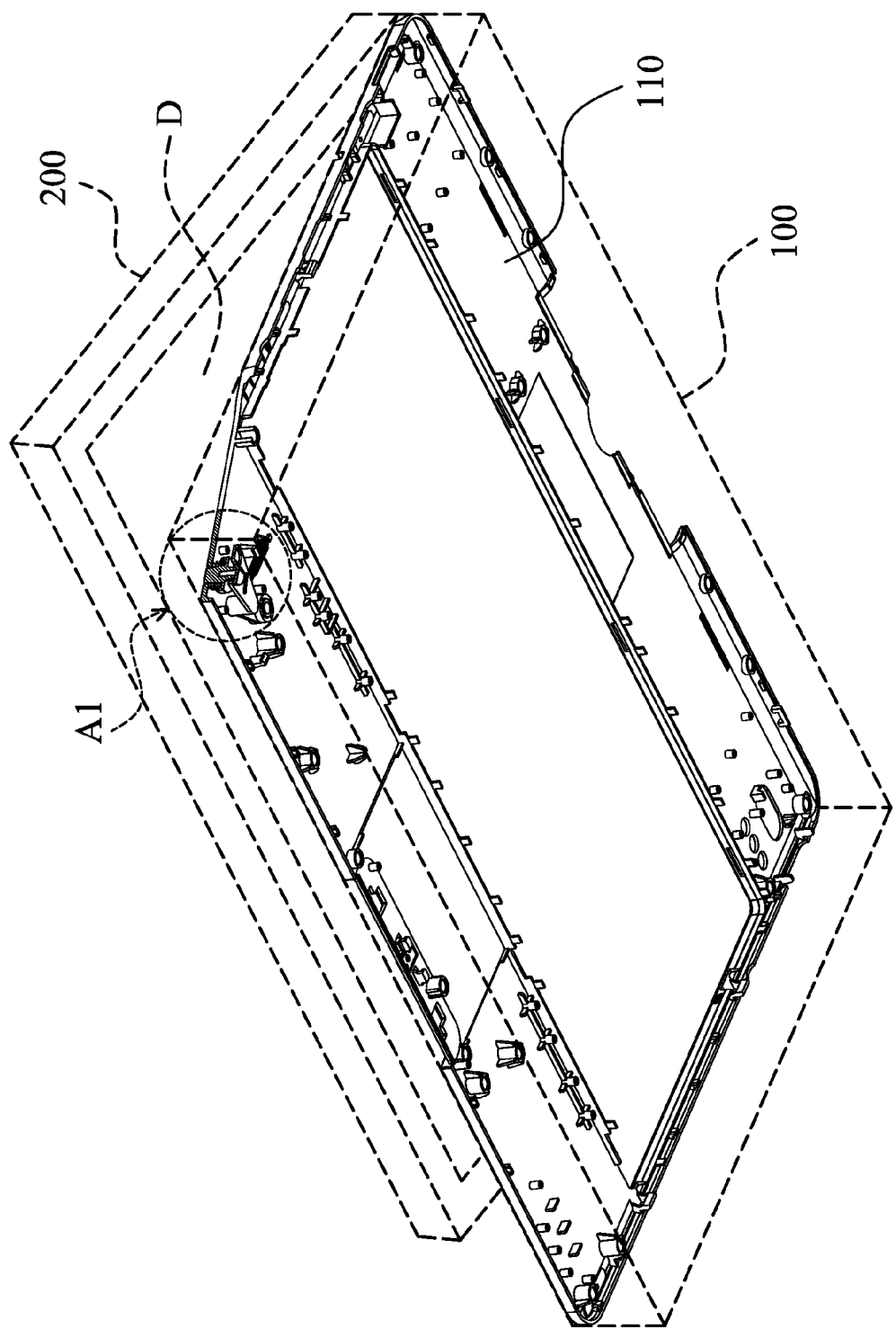
FIG. 4A is a perspective diagram of an unfolded display module with respect to a main body according to an embodiment of the invention.
Figure 4B:
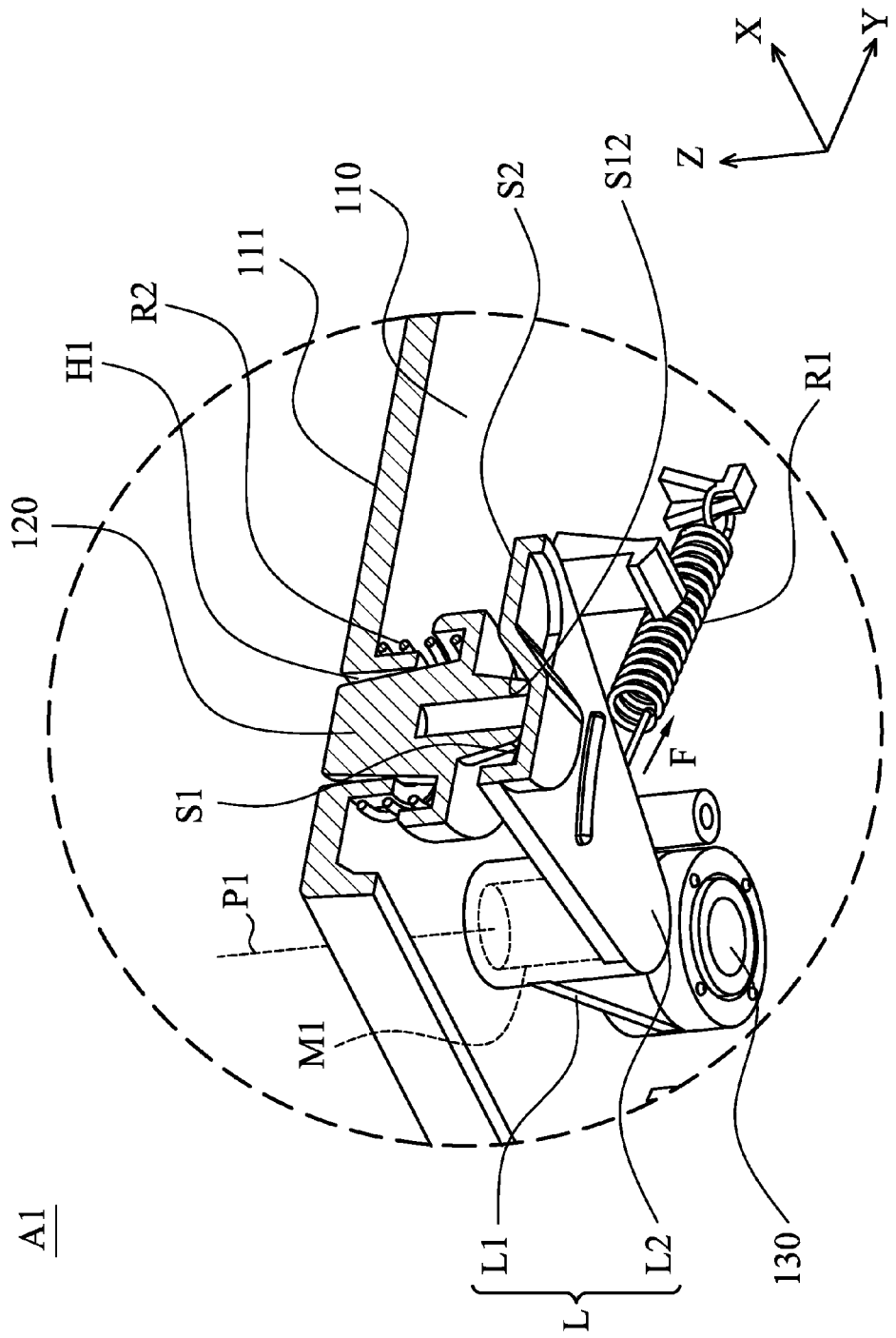
FIG. 4B is a large view of the portion A1 in FIG. 4A.

Referring to FIGS. 4A and 4B, wherein FIG. 4A is a perspective diagram showing the display module 200 unfolded with respect to the main body 100, and FIG. 4B is a large view of the portion A1 in FIG. 4A. The main body 100 in FIG. 4B comprises a first casing 110 with a joining member 120, a lever L, a first magnet M1, a first spring R1, and a second spring R2 disposed therein. When the display module 200 is unfolded, the joining member 120 is accommodated in a first opening H1 of the first casing 110, wherein a top surface of the joining member 120 is substantially aligned with a surface 111 of the first casing 110, so as to not affect aesthetic and integral appearance of the main body 10.

In FIG. 4B, the lever L is pivotally connected with the first casing 110 via a hinge 130. The lever L comprises a first section L1 and a second section L2 fixed to each other, wherein the first section L1 connects the hinge 130 with the first magnet M1, and the second section L2 connects the first magnet M1 with the joining member 120. In this embodiment, the second section L2 has a spoon-shaped portion with a bottom surface S1 and a top surface S2 formed thereon. The distance between the bottom surface S1 and the first opening H1 exceeds that of the top surface S2 and the first opening H1.

The first spring R1 in FIG. 4B is a tensional spring connecting the lever L with the first casing 110. The second spring R2 is a compression spring between and in contact with the joining member 120 and the first casing 110. When the display module 200 is unfolded with respect to the main body 100, the lever L is forced by the first spring R1, such that the first magnet M1 is stationary in a first position P1, as shown in FIG. 4B. Additionally, the joining member 120 is forced by the second spring R2 and hidden in the first opening H1. In this state, the joining member 120 does not protrude beyond the surface 111 of the first casing 110 to not affect aesthetic and integral appearance of the main body 10.

Figure 5A:
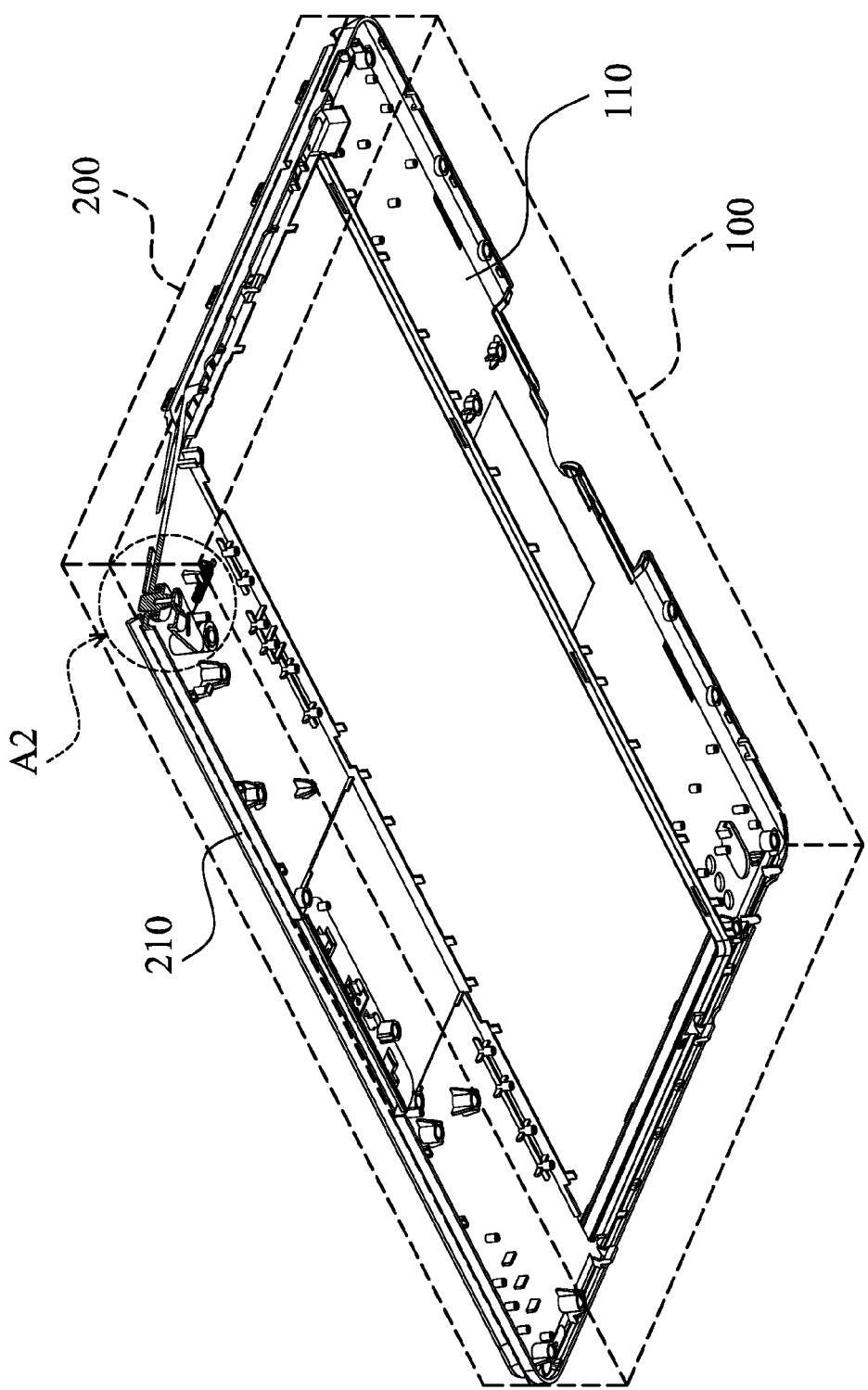
FIG. 5A is a perspective diagram of a display module folded with respect to a main body according to an embodiment of the invention.
Figure 5B:
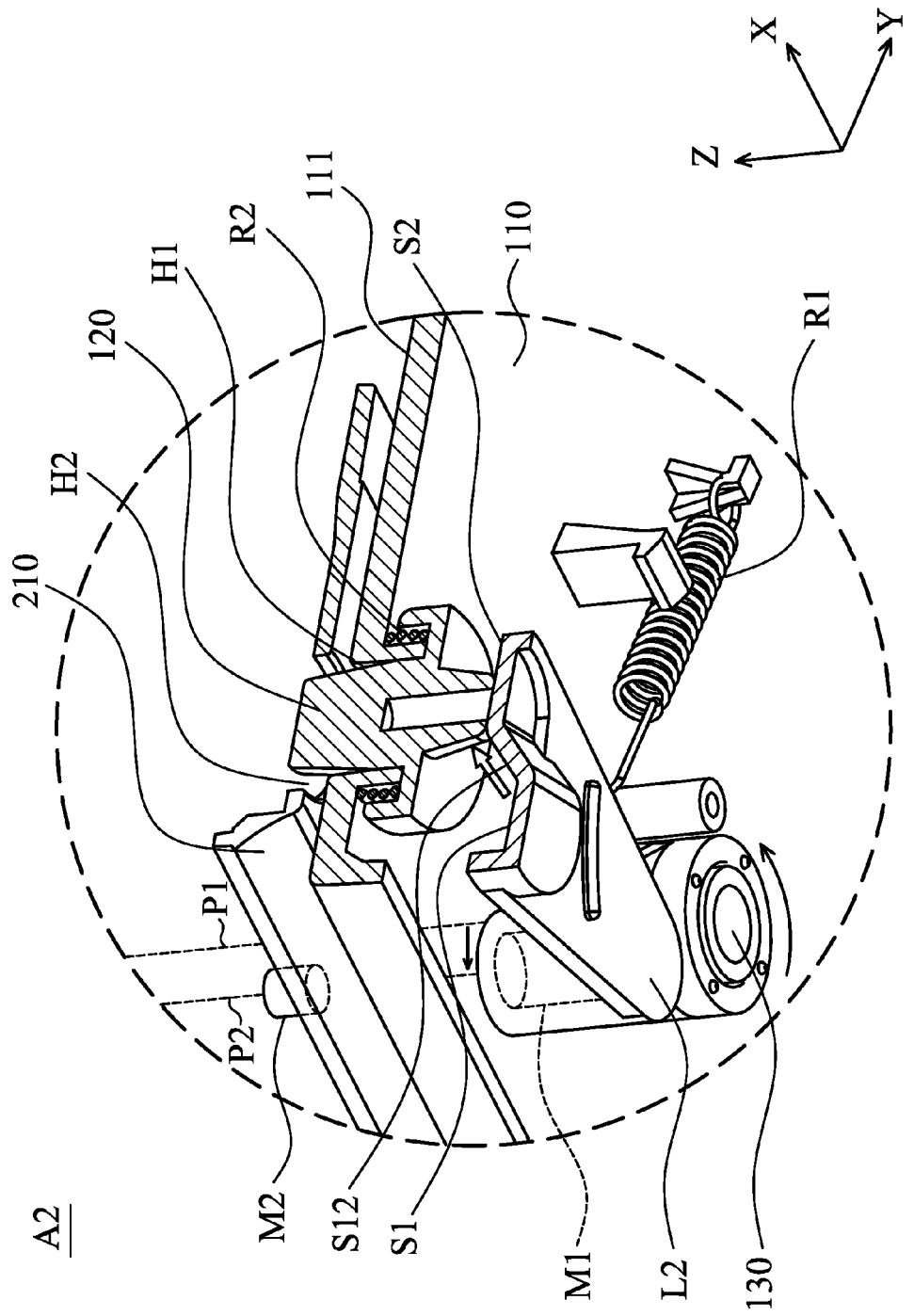
FIG. 5B is a large view of the portion A2 in FIG. 5A.

Referring to FIGS. 5A and 5B, wherein the FIG. 5A is a perspective diagram showing the display module 200 folded with respect to the main body 100, and FIG. 5B is a large view of the portion A2 in FIG. 5A, wherein a second casing 210 of the display module 200 abuts with the first casing 110 of the main body 100. As depicted in FIG. 5B, a second magnet M2 is disposed in the display module 200 and attracts the first magnet M1 from the first position P1 to a second position P2 when the display module 200 is folded to the main body 100.

As the first magnet M1 is attracted by the second magnet M2 from the first position P1 to the second position P2, the spoon-shaped portion of the lever L rotates around the hinge 130. Meanwhile, the joining member 120 slides from the bottom surface S1 through a slope S12 to the top surface S2, as the arrow indicates in FIG. 5B. Thus, the joining member 120 is elevated and protrudes from the surface 111 of the first casing 110, so as to join with a second opening H2 of the second casing 210.

As described above, when the display module 200 and the main body 100 are folded, the joining member 120 protrudes from the surface 111 of the first casing 110 and joins to the second opening H2 of the second casing 210 by magnetic attraction between the first and second magnets M1 and M2, so as to restrict rotation between the display module 200 and the main body 100. On the contrary, when unfolding the display module 200 with respect to the main body 100, the first and second magnets M1 and M2 are distanced from each other, the lever L is pushed by the first spring R1, so that the first magnet M1 returns to the first position P1. Specifically, when the display module 200 is unfolded, the joining member 120 is forced by the second spring R2 to disappear in the first opening H1, so as to not affect aesthetic and integral appearance of the main body 10.

The present application provides an electronic device with a joining mechanism capable of not affect aesthetic and integral appearance thereof. Also, when of the electronic device is folded, rotation between the display module and the main body are restricted, thus providing convenient usage to users.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
a main body, comprising a first casing having a first opening;
a display module, pivotally connecting to the main body and comprising a second casing;
a lever, disposed in the main body and pivotally connected to the first casing, wherein the lever comprises a spoon-shaped portion;
a joining member, movably received in the first opening and connected to the spoon-shaped portion;
a first magnet, disposed on the lever; and
a second magnet, disposed in the display module, wherein when the display module is folded with respect to the main body, the second magnet attracts the first magnet from a first position to a second position, and the spoon-shaped portion pushes the joining member to protrude from the first casing and join with the second casing.

2. The electronic device as claimed in claim 1, wherein the spoon-shaped portion has a bottom surface and a top surface, and when the display module is folded with respect to the main body, the joining member slides from the bottom surface to the top surface, wherein the distance between the bottom surface and the first opening exceeds that of the top surface and the first opening.

3. The electronic device as claimed in claim 2, wherein the spoon-shaped portion further has a slope connecting the bottom surface with the top surface.

4. The electronic device as claimed in claim 1, wherein the electronic device further comprises a first spring connecting the first casing with the lever.

5. The electronic device as claimed in claim 4, wherein the first spring is a tensional spring.

6. The electronic device as claimed in claim 1, wherein the electronic device further comprises a second spring between and in contact with the first casing and the joining member.

7. The electronic device as claimed in claim 6, wherein the second spring is a compression spring.

8. The electronic device as claimed in claim 1, wherein the electronic device further comprises a hinge, rotatably connecting the first casing with the lever, and the lever comprises a first section and a second section, wherein the first section connects the hinge with the first magnet, and the second section connects the first magnet with the joining member.

9. The electronic device as claimed in claim 1, wherein the second casing has a second opening with the joining member joined therein when the display module is folded with respect to the main body, so as to restrict rotation between the display module and the main body.

10. The electronic device as claimed in claim 1, wherein the electronic device is a laptop PC or tablet PC.

* * * * *